United States Patent [19]

Ruckwardt

[11] Patent Number: 5,577,695
[45] Date of Patent: Nov. 26, 1996

[54] RETAINING ELEMENT

[75] Inventor: Hans-Werner Ruckwardt, Gollheim/Pfalz, Germany

[73] Assignee: TRW United Carr GmbH & Co. KG, Enkenbach-Alsenborn, Germany

[21] Appl. No.: 182,656

[22] Filed: Jan. 18, 1994

[30] Foreign Application Priority Data

Feb. 1, 1993 [DE] Germany .................. 43 02 760.1

[51] Int. Cl.⁶ .................................................. F16M 11/00
[52] U.S. Cl. .................. 248/200; 248/309.1; 248/903; 403/403
[58] Field of Search ................................ 248/200, 205.1, 248/220.21, 300, 309.1, 903; 403/403

[56] References Cited

U.S. PATENT DOCUMENTS

| | | | |
|---|---|---|---|
| 3,729,159 | 4/1973 | Foster | 248/205.1 X |
| 4,875,651 | 10/1989 | Wergin et al. | 248/903 X |
| 5,016,873 | 5/1991 | Bossa | 403/403 X |
| 5,195,710 | 3/1993 | Remblier | 248/300 |

*Primary Examiner*—Ramon O. Ramirez
*Attorney, Agent, or Firm*—Daniel G. Blackhurst

[57] ABSTRACT

The invention relates to a retaining element 1 for attachment of a part to a support, specifically at least one signal horn to a motor vehicle body, with two areas 2, 3, wherein the one area 2 is connected with the support and the other area 3 with the part, respectively via at least one attachment element. The retaining element consists of plastic and the two areas 2, 3 of the retaining element 1 are connected with each other and each include reenforcing flange portions 5, 6 which surround the two areas 2, 3.

12 Claims, 1 Drawing Sheet

RETAINING ELEMENT

BACKGROUND OF THE INVENTION

The subject invention relates to a retaining element for fastening a part to a support, for example, for connecting at least one signal horn to an automobile body. The retaining element includes two areas, with one area for connection with the support and the other area for connection with the part via at least one fastening element.

A construction already exists in the generally known state of the art where the retaining element consists of several individual metal parts. In this prior design, one of the metal parts has multiple angles and is connected at one end with the support via a fastening element. An exterior leg of one angle is connected with a rectilinearly extending second part via an additional fastening element at the outer area of which the signal horn is held via a third fastening element.

This results in a design that is expensive to construct, inasmuch as the retaining element consists of several parts that have to be connected with each other. Additionally, because of the metal construction of the retaining element, there may occur undesirable vibrations that will detrimentally affect the attachment between the parts of the retaining element. The vibrations are also noise-producing.

In contrast thereto, the object of the present invention is to create a retaining element of the initially mentioned kind that has a simpler construction that is cost-effectively designed and which reduces undesirable vibrations.

SUMMARY OF THE INVENTION

According to the invention, the object is achieved in that the retaining element is designed in one piece of plastic and the two areas of the retaining element are connected with each other, and each includes integral reinforcement portions. As a result of the solid design of the plastic retaining element, there is gained the advantage of a less complicated, cost-saving manufacture. Moreover, the reinforcements stabilize the entire unit and, in addition, undesirable vibrations are greatly reduced.

The retaining element is made of plastic and, beneficially, a glass-fiber filler portion may be applied for additional strength.

In a further refinement of the invention, the two areas may be connected with each other via an angularly shaped center area with two legs. The center area can have a U-shaped cross-section. In addition, the angularly shaped area can exhibit at least one reinforcing rib between the two legs. The one leg can pass rectilinearly into the adjacent first area, while the other leg borders at an angle on the adjacent other area. Each area can have a through aperture that is surrounded by an outwardly spaced, circumferential fortification rib.

In further refinement of the invention, at least one area can include, at the surface facing the support and/or the part, a demarkation edge which simultaneously constitutes a protection against twisting.

By using plastic as the material for the retaining element according to the invention, there beneficially results a reduction in the number of individual parts, a reduction in assembly steps, and avoidance of corrosion problems. When mounting at least one signal horn onto a support, for instance onto the body of a motor vehicle, there is furthermore compliance with manufacturers' acoustical guidelines and corresponding DIN-Standards.

BRIEF DESCRIPTION OF THE DRAWINGS

In the description that follows, the invention is described in more detail, using the preferred embodiment illustrated in the drawings wherein.

DETAILED DESCRIPTION OF THE PREFERRED EMBODIMENT

Figure 1:
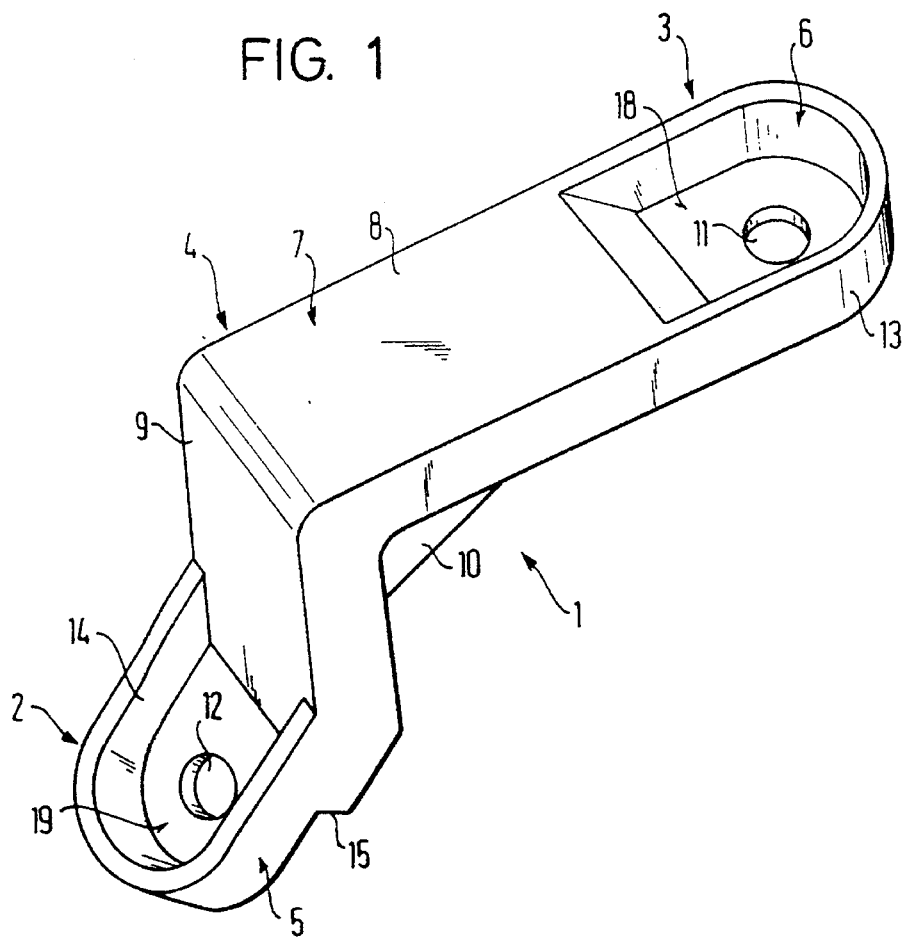
FIG. 1 is a perspective view of the retaining element according to the invention; and, FIG. 2 is a side elevational view showing the retaining element according to the invention in its mounted state.

Referring more particularly to the drawings wherein the showings are for the purpose of illustrating a preferred embodiment of the invention only and not for the purpose of limiting same, FIG. 1 shows the overall arrangement of the retaining element 1, designed as a single piece and formed of plastic material, preferably with glass fiber fortification or reenforcement. The retaining element 1 has a first support area 2 as well as a second area 3. These two areas 2, 3 are connected with each other via a fortification in the form of an intermediate portion 4 designed with an angularly shaped center area 7.

The center area 7 includes legs 8, 9, which pass over and join into the two areas 2 and 3. The center area 7 can be designed so that it has a U-shape in cross-section. As is additionally apparent from FIG. 1, there is at least one reenforcing rib 10 arranged as a brace between the two legs 8 and 9 of the angularly-shaped center area 7.

The one leg 8, moreover, extends in a straight line into the adjacent area 3, whereas the other leg 9 borders, at an angle, on the adjacent other area 2. Each area 2 and 3 exhibits a through aperture 11, 12 that is surrounded at an outwardly spaced location by a circumferential reenforcing 5, 6 defined by ribs or flanges 13 and 14. The two areas 2 and 3 thus each have the shape of a dish wherein the two bottom surfaces 18 and 19 through which the apertures 11 and 12 extend are defined and limited by flanges or ribs 13 and 14.

As is apparent from FIG. 1, area 2 exhibits, for example, at the surface facing the support, a boundary edge or shoulder 15 which concurrently constitutes protection against twisting.

Figure 2:
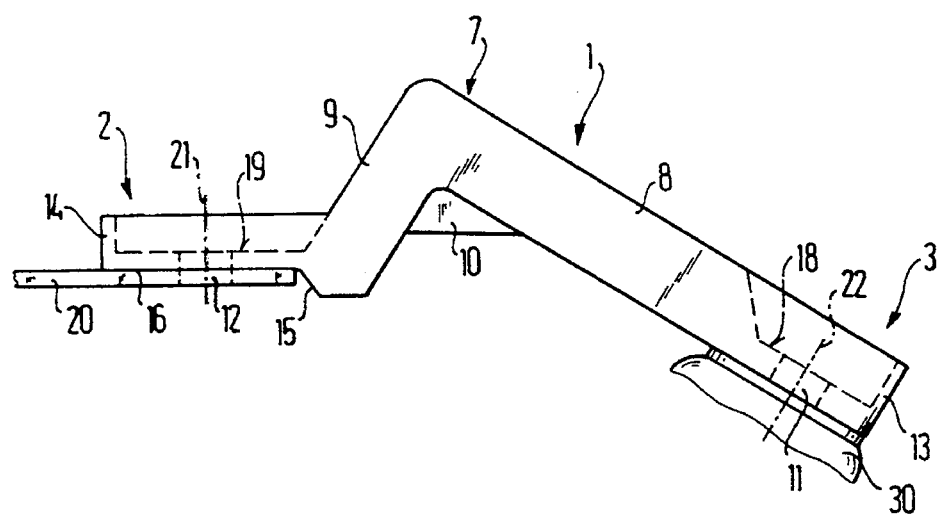

FIG. 2 shows the installation of the retaining element 1 at a support 20. In this arrangement, the retaining element 1 is bolted via an attachment element 21 (not shown) to the support. If attachment element 21 is a bolt, then the head of the bolt beneficially embeds itself in the dish-shaped area 2 of retaining element 1, and can be protected from twisting by the reinforcements 14.

The other area 3 is shaped similarly to area 2. Here, via an attachment element 22 (not shown), there can be affixed at least one signal horn 30. If the attachment element 22 is, once again, designed as bolt, then the bolt head also positions itself in the dish-shaped area 3 of the retainer element 1 and can likewise be protected against twisting by the reinforcements 13.

As a result of the dish-like design of areas 2 and 3 and also due to the reinforcement via the center area 7 with rib 10, there is produced a retaining element which exhibits extremely high stability and which largely reduces undesired vibrations. The retaining element 1 can be produced at a savings in cost. In comparison with retaining elements according to the known state of the art, it exhibits significant improvement from an acoustic as well as mechanical/dynamic aspect.

The following, as well as other known plastics, can be used as the plastic material for constructing the invention: Polypropylene, Polyoxymethylene, Polyamode, Acrylonitrile/Butadrene/Styrene, Polyethylene Terephthalate, Polybulylene Terephthalate, Polycarbonate, Polyphenylene Oxide, PSU, PES, and Polyphenylene Sulfide. The reinforcements besides glass fibers, can be carbon fibers, glass spheres, talcum, mineral or steel fibers. The reinforcement portion can lie within the ranges of from 10% to 50% by volume. Instead of attachment of at least one signal horn by the retaining elements 1 according to the invention, other parts can also be attached to a motor vehicle body or another support, for instance acoustical warning signal devices for public vehicles or other acoustical warning devices.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A retaining element for attaching a part such as a signal horn to a support such as a motor vehicle body, the retaining element comprising a unitary plastic body (1) having a first area (2) for connection to the support and a second area (3) for connection to the part, the first and second areas (2, 3) being joined by a center portion (7) of the body (1) and each of the first and second areas (2, 3) having an encircling fortification flange (5, 6).

2. A retaining element as defined in claim 1 wherein the unitary body is a plastic filled with reinforcement material.

3. A retaining element as defined in claim 2 wherein the portion of the reinforcement material is a maximum of 50% of the volume of the plastic material.

4. A retaining element as defined in claim 1 wherein the two areas (2, 3) are connected with each other via at least one constructive reinforcement (4).

5. A retaining element as defined in claim 4 wherein the center portion (7) is angle-shaped with two angularly related legs (8, 9).

6. A retaining element as defined in claim 5 wherein the center portion (7) has a U-shaped design in cross-section.

7. A retaining element as defined in claim 5 wherein the angle-shaped center portion (7) has at least one rib (10) having bracing between the two legs (8, 9).

8. A retaining element as defined in claim 6 wherein one leg (8) passes rectilinearly into the adjacent area (3) and the other leg (9) joins at an angle into the adjacent other area (2).

9. A retaining element as defined in claim 1 wherein each area (2, 3) has a through aperture (11, 12), which is located centrally of the associated encircling fortification flange (5, 6).

10. A retaining element as defined in claim 1 wherein at least one area (2, 3) exhibits at the surface facing the support and/or the part, a delineation edge flange (15).

11. A retaining element as defined in claim 1 wherein the material of the body (1) comprises a plastic selected from the group consisting of PP, POM, PA, ABS, PETP, PBTP, PC, PPO, PSU, PES, or PPS.

12. A retaining element as defined in claim 2 wherein the filling material is selected from the group consisting of glass fibers, carbon fibers, glass spheres, talcum, minerals, or steel fibers.

* * * * *